(12) United States Patent
Gamadia et al.

(10) Patent No.: US 12,028,611 B1
(45) Date of Patent: Jul. 2, 2024

(54) NEAR DISTANCE DETECTION FOR AUTOFOCUS

(71) Applicant: Apple Inc., Cupertino, CA (US)

(72) Inventors: Mark N Gamadia, Campbell, CA (US); Zhongmin Wang, Cupertino, CA (US); Moshe Laifenfeld, Haifa (IL); Yingjun Bai, San Jose, CA (US)

(73) Assignee: Apple Inc., Cupertino, CA (US)

( * ) Notice: Subject to any disclaimer, the term of this patent is extended or adjusted under 35 U.S.C. 154(b) by 15 days.

(21) Appl. No.: 17/664,355

(22) Filed: May 20, 2022

Related U.S. Application Data

(60) Provisional application No. 63/208,942, filed on Jun. 9, 2021.

(51) Int. Cl.
*H04N 23/67* (2023.01)

(52) U.S. Cl.
CPC ......... *H04N 23/671* (2023.01); *H04N 23/673* (2023.01)

(58) Field of Classification Search
CPC ................ H04N 23/671; H04N 23/673; G01S 17/08–36
USPC .................................. 348/348; 356/5.01–5.8
See application file for complete search history.

(56) References Cited

U.S. PATENT DOCUMENTS

| | | | |
|---|---|---|---|
| 8,477,232 B2 * | 7/2013 | Forutanpour | G06T 7/564 348/625 |
| 9,779,276 B2 | 10/2017 | Todeschini et al. | |
| 2017/0184704 A1 * | 6/2017 | Yang | H04N 13/239 |
| 2018/0120534 A1 * | 5/2018 | Mohri | H04N 23/675 |
| 2018/0234617 A1 | 8/2018 | Przyborski | |
| 2018/0252894 A1 * | 9/2018 | Tang-Jespersen | H04N 23/56 |
| 2018/0352167 A1 * | 12/2018 | Okada | H04N 23/62 |
| 2019/0313007 A1 * | 10/2019 | Kim | G03B 13/20 |
| 2020/0267323 A1 * | 8/2020 | Zhou | G01S 15/08 |
| 2020/0349728 A1 * | 11/2020 | Bitan | H04N 23/56 |
| 2020/0412980 A1 | 12/2020 | Agranov et al. | |
| 2022/0132043 A1 * | 4/2022 | Park | G01S 17/894 |

FOREIGN PATENT DOCUMENTS

WO 2020153703 7/2020

* cited by examiner

*Primary Examiner* — Lin Ye
*Assistant Examiner* — Chan T Nguyen
(74) *Attorney, Agent, or Firm* — Robert C. Kowert; Kowert, Hood, Munyon, Rankin & Goetzel, P.C.

(57) ABSTRACT

Various embodiments disclosed herein include techniques for determining autofocus for a camera on a mobile device. In various instances, a depth imaging system (e.g., a time-of-flight autofocus system (ToF-AF system)) is used to determine distance of a subject in order to determine autofocus for a camera. In some instances, however, the ToF-AF system may be unable to detect a subject that is very close to the camera when the objects are below a minimum detectable distance of the ToF-AF system. In such instances, an existing IR detector outside of the ToF-AF system may be implemented to measure reflected signals from the ToF-AF system. A power ratio may be determined from the reflected signals and used to determine information about the distance of the subject from the camera.

20 Claims, 11 Drawing Sheets

1200

Transmit, by a time-of-flight system on a device, an infrared light signal.
1202

Receive, by an infrared detector on the device that is independent of the time-of-flight system, a reflected infrared signal where the reflected infrared signal includes infrared light from the time-of-flight system reflected off at least one surface positioned in a field-of-view of the infrared detector and the time-of-flight system.
1204

Assess the reflected infrared signal received by the infrared detector to determine whether the at least one surface is within a predetermined distance from the device.
1206

FIG. 12

NEAR DISTANCE DETECTION FOR AUTOFOCUS

BACKGROUND

This application claims benefit of priority to U.S. Provisional Application Ser. No. 63/208,942, entitled "Near Distance Detection for Autofocus," filed Jun. 9, 2021, which is hereby incorporated herein by reference in its entirety.

TECHNICAL FIELD

Embodiments described herein relate to camera systems. More particularly, embodiments described herein relate to methods for providing autofocus in camera systems.

DESCRIPTION OF THE RELATED ART

The advent of small, mobile multipurpose devices such as smartphones and tablet or pad devices has resulted in a need for high-resolution, small form factor cameras for integration in the devices. Such cameras may include an autofocus (AF) mechanism to adjust the camera's focal distance to focus an object plane or field in front of the camera at an image plane to be captured by an image sensor. In some such autofocus mechanisms, the optical lens is moved along the optical axis of the camera to focus and refocus the camera.

Many mobile devices implement passive autofocus systems to provide autofocus. Examples of passive autofocus systems include, but are not limited to, phase detection autofocus and contrast based autofocus. In the instance of mobile device cameras, phase detection autofocus (PDAF) may be achieved by splitting a camera pixel into multiple separate photodiodes or selectively masking a portion of a pixel to generate asymmetric pixels. Each asymmetric pixel preferentially receives light from a given direction, and pixels associated with a common direction can be grouped together. The groups of pixels will have disparate signals when the image is not in focus but well matched signals when the image is in focus. Thus, the groups of pixels may provide information that can be used by an AF mechanism to adjust the focus of an image (e.g., using phase difference between the groups of pixels). An example of PDAF on mobile devices is described in U.S. Pat. No. 10,440,301 to Li et al., which is incorporated by reference as if fully set forth herein. PDAF is most commonly used in mobile devices as PDAF processing provides fast and accurate autofocusing. PDAF, however, has issues determining focus positions in low light conditions or on flat textures because it is difficult to determine any separation between the pairs of images.

Contrast based autofocus (CBAF) is achieved by measuring contrast within a sensor field through a lens. The intensity difference between adjacent pixels of the sensor naturally increases with correct image focus. Thus, the focus position can be adjusted until a maximum contrast is determined. CBAF may be available for a wider range of use situations (e.g., wide range of light levels) than PDAF but CBAF is slower to determine the focus position, which may limit the camera's ability to quickly set a focus position. Additionally, CBAF may have difficulty in tracking moving objects.

Recently, many mobile devices have begun to implement time-of-flight autofocus (ToF-AF) systems in addition to PDAF and CBAF. A ToF-AF system is an active system that generate its own light signal in order to determine distances to objects in its field-of-view. As ToF-AF is an active system, ToF-AF is useable in a wide variety of light conditions and for detecting distances to a wide variety of objects (including flat objects without texture). ToF-AF also provides fast response times for determining autofocus positions. ToF-AF, however, may have difficulty in determining distances to objects that are positioned in close proximity to the system because the sensor in the ToF-AF may get oversaturated with signal when the object is in close proximity to the sensor. Since many current implementations of mobile devices include wide and/or super-wide lenses that have the ability to capture focused images of close proximity objects, the failure ToF-AF in these instances can be problematic. In some instances, a proximity sensor may be added to a mobile device in order to detect close proximity objects for use in autofocusing. The addition of a proximity sensor to the mobile device, however, adds significant cost to the mobile device in both manufacturing cost and area cost on the mobile device.

BRIEF DESCRIPTION OF THE DRAWINGS

Features and advantages of the methods and apparatus of the embodiments described in this disclosure will be more fully appreciated by reference to the following detailed description of presently preferred but nonetheless illustrative embodiments in accordance with the embodiments described in this disclosure when taken in conjunction with the accompanying drawings in which:

FIG. 12 is a flow diagram illustrating a method for implementing a focus process, according to some embodiments.

Figure 2:
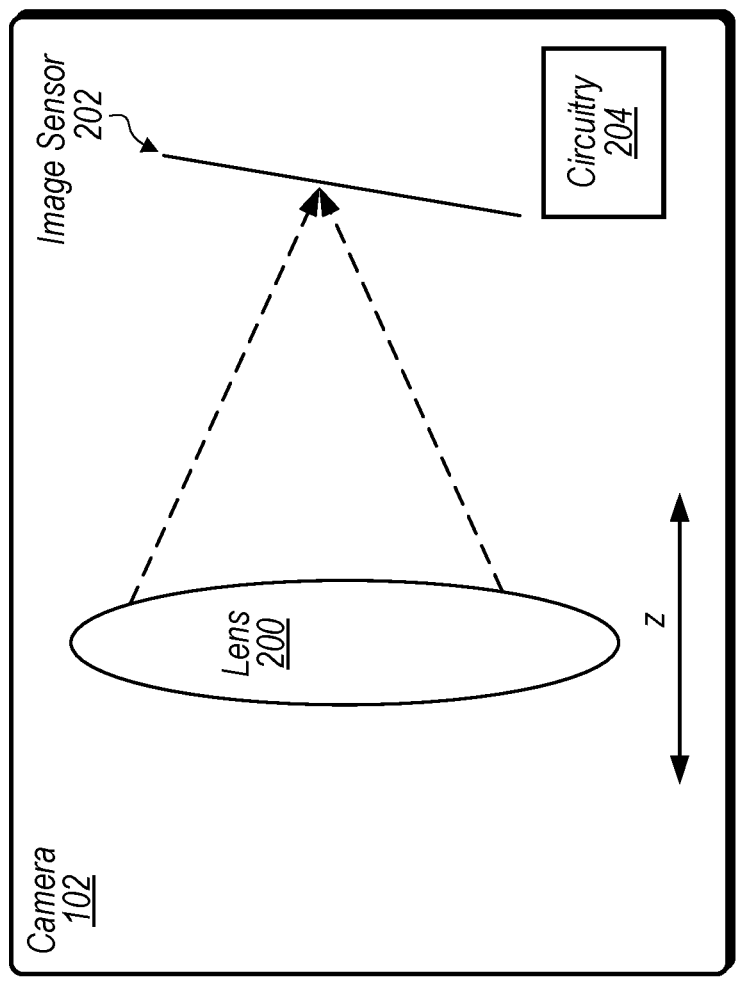
FIG. 2 depicts a side view representation of an embodiment of a camera showing a lens and an image sensor.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION OF EMBODIMENTS

Figure 1:
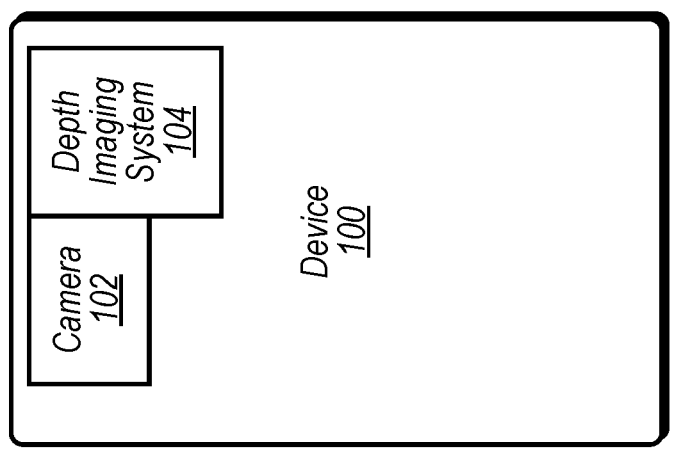
FIG. 1 depicts a representation of an embodiment of a mobile device.

FIG. 1 depicts a representation of an embodiment of mobile device 100. Device 100 may be a small multipurpose computing device including any of various types of a computer system device that is mobile or portable and is capable of performing wireless communication. Examples of mobile devices include, but are not limited to, cell phones, smartphones, pad or tablet computing devices, laptop, netbook, notebook, subnotebook, and ultrabook computers. Various other types of devices may fall into this category if they include wireless or RF communication capabilities (e.g., Wi-Fi, cellular, and/or Bluetooth) and have a camera, such as portable gaming devices, portable Internet devices, and other handheld devices, as well as wearable devices. As described herein, the term "mobile device" may be defined to encompass any multipurpose electronic, computing, and/or telecommunications device (or combination of devices) that is easily transported by a user, is capable of wireless communication (using, for example, WLAN, Wi-Fi, cellular, and/or Bluetooth), and has a camera, where the device's primary purpose is telecommunication, computing, and/or electronic gaming.

In certain embodiments, device 100 includes one or more cameras (such as camera 102). Camera 102 may be located either front-facing on device 100 (e.g., facing on same side as a display of the mobile device) and/or back-facing on the device (e.g., facing on an opposite side as the display). In some embodiments, device 100 may include multiple cameras 102. For example, device 100 may include cameras that provide different fields of view such as telephoto, wide-angle, super-wide-angle, etc. Each camera 102 may have its own set of one or more lenses and image sensor (e.g., image sensor 202, described below). The multiple cameras may be operated together or independently. In some embodiments, one camera is used for preview imaging (e.g., previewing the image on a display of device 100). An example of a multiple camera system is described in U.S. Pat. No. 10,429,608 to Baer et al., which is incorporated by reference as if fully set forth herein.

In certain embodiments, camera 102 includes one or more lenses and an image sensor. FIG. 2 depicts a side view representation of an embodiment of camera 102 showing lens 200 and image sensor 202. While camera 102 is shown to include one lens (e.g., lens 200) in the depicted embodiment, it is to be understood that the number of lenses in the camera may vary. For example, camera 102 may include a stack of lenses that operate together in combination with image sensor 202. In embodiments with multiple cameras, different cameras with different lenses may be used for different modes on device 100. For example, one camera may include a wide-angle lens for a wide-angle field of view, a second camera may include a telephoto lens for a magnified field of view, and/or a third camera may include a super-wide-angle lens for large fields of view. As described above, each camera 102 may have its own corresponding image sensor 202.

As shown in FIG. 2, lens 200 focuses incident light onto image sensor 202. In certain embodiments, camera 102 includes an autofocus position system that implements autofocus mechanisms for focusing camera 102. For example, in some embodiments, an autofocus mechanism may control a position of lens 200 with respect to image sensor 202 (e.g., along the optical axis or z-direction, as shown by the arrow in FIG. 2) to provide focusing capabilities for camera 102. Adjusting (e.g., controlling) the position of lens 200 adjusts the camera's focal distance to focus an object plane or field in front of camera 102 at an image plane to be captured by image sensor 202. Examples of autofocus mechanisms for providing focus in cameras is described in U.S. Pat. No. 10,365,121 to Wong et al. and U.S. Pat. No. 10,303,041 to Sharma, both of which are incorporated by reference as if fully set forth herein. In some embodiments, the position of lens 200 relative to image sensor 202 corresponds to a practical focal length (PFL) of the lens. The practical focal length may be determined using autofocus processes described herein.

In certain embodiments, device 100 implements one or more autofocus processes to determine the position of lens 200 for focus on a subject in the field of view of the camera. An autofocus process may determine a position of lens 200 that provides focus on a particular object plane or field in front of camera 102. An autofocus process may be a passive autofocus process relying on images captured by the camera itself (e.g., a camera-based autofocus process) or an active autofocus process that generates its own light signal for determining focus position (e.g., a depth imaging process). Examples of passive autofocus processes include, but are not limited to, phase detection autofocus (PDAF) and contrast based autofocus (CBAF). Time-of-flight autofocus (ToF-AF) is an example of an active autofocus process. In certain embodiments, device 100 is capable of operating any of phase detection autofocus (PDAF), contrast based autofocus (CBAF), and time-of-flight autofocus (ToF-AF). Techniques for determining which autofocus process to implement are described herein.

Figure 13:
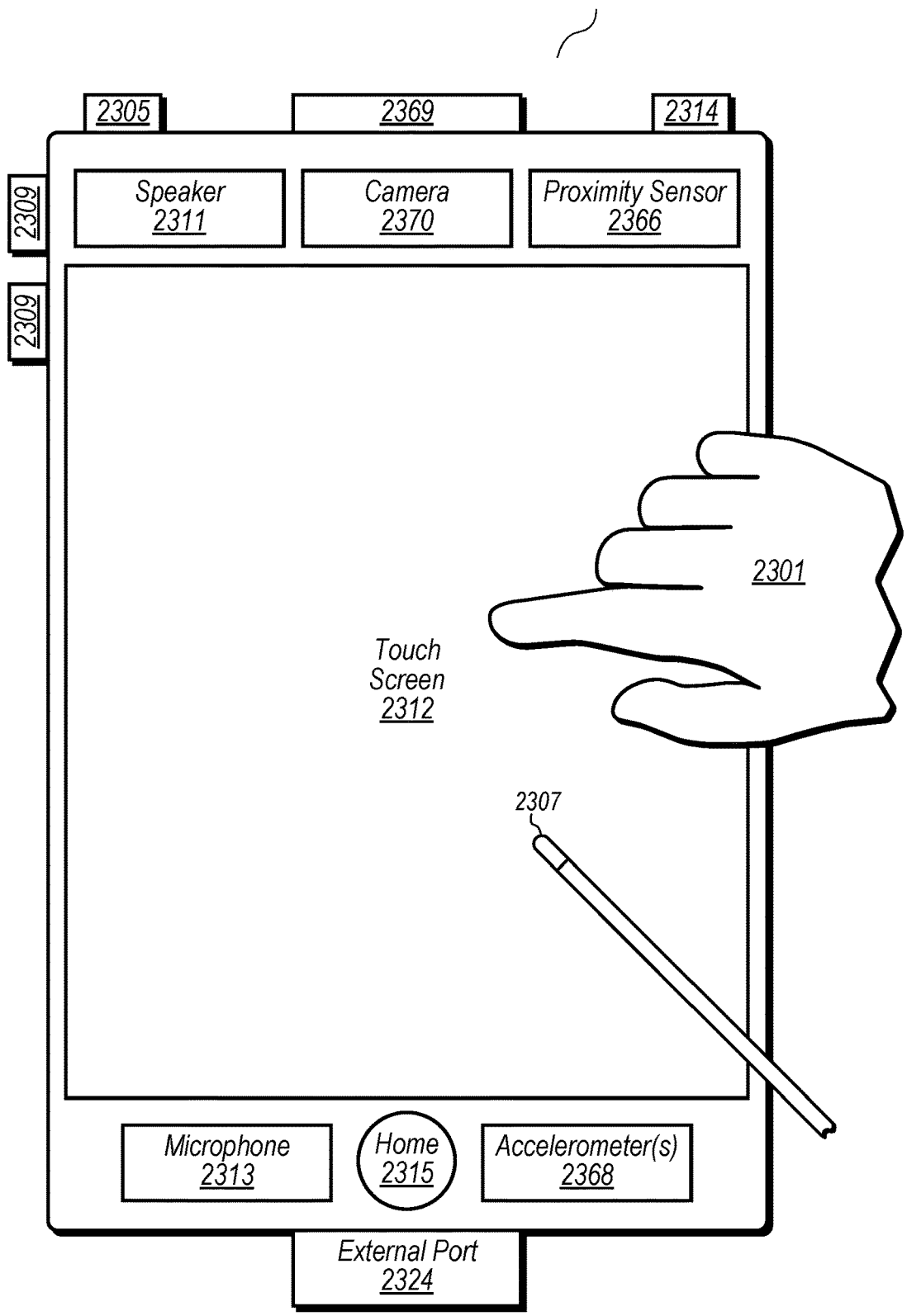
FIG. 13 illustrates a "front" side of a mobile device.
Figure 14:
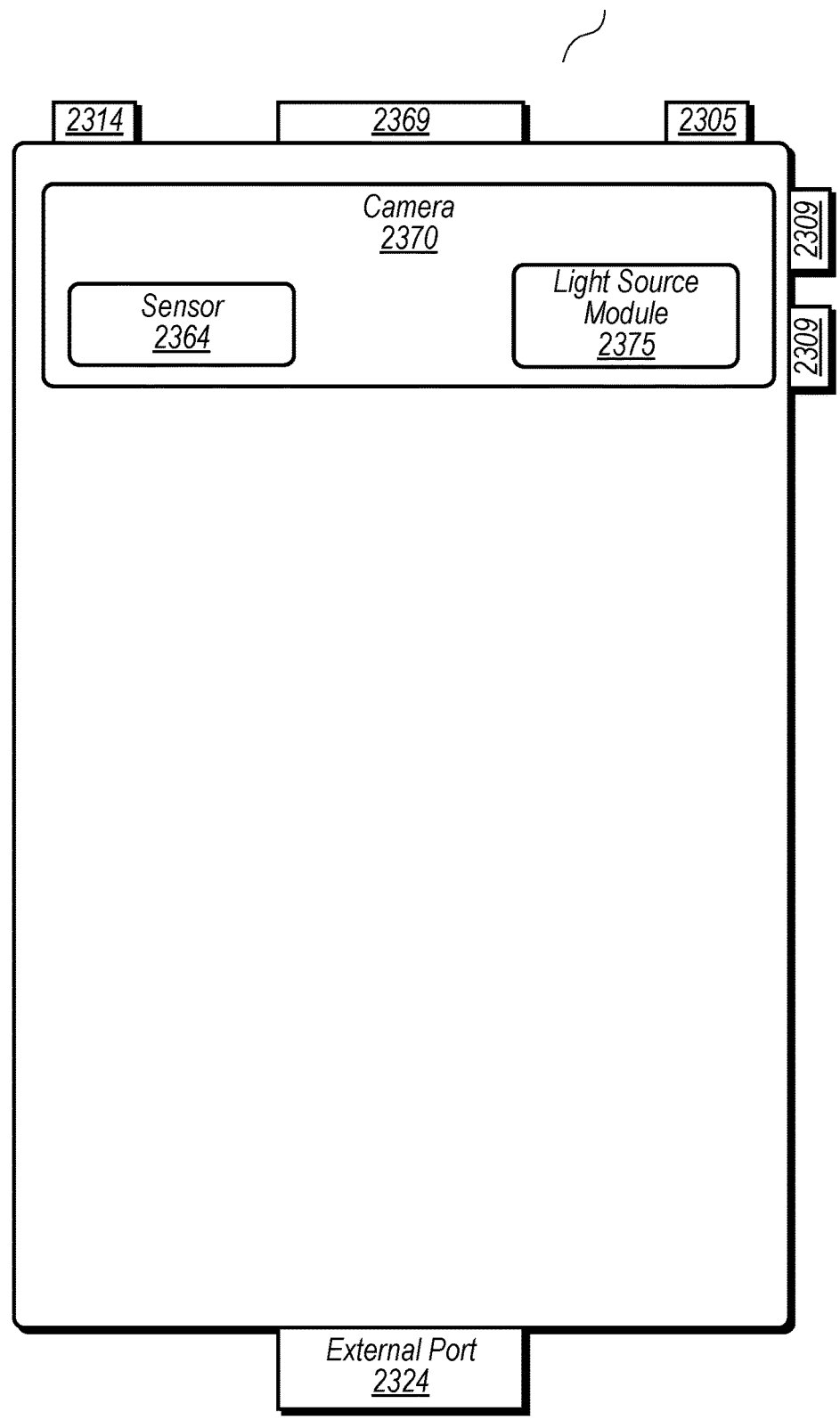
FIG. 14 illustrates a "rear" side of a mobile device.
Figure 15:
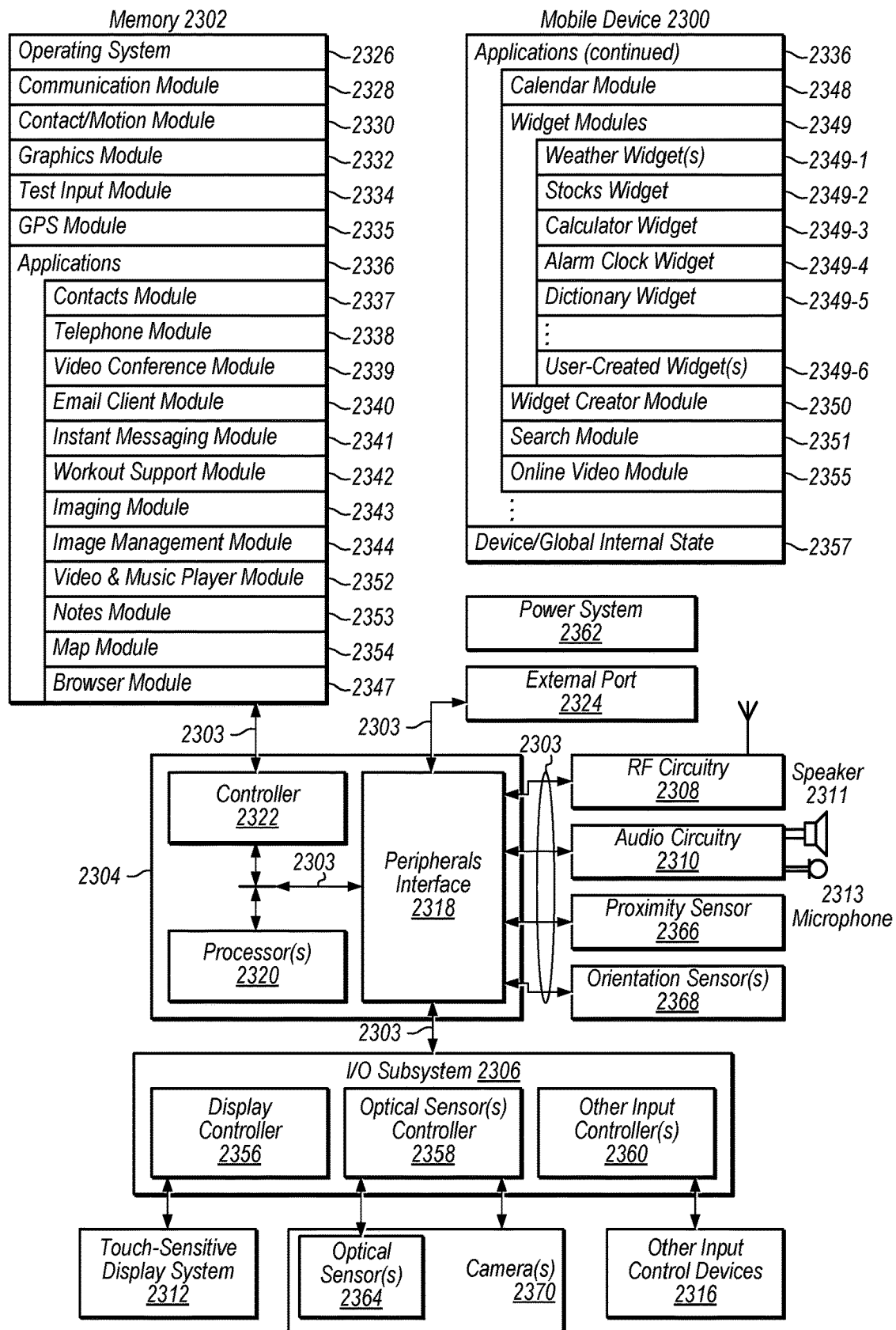
FIG. 15 illustrates a block diagram of a mobile device.

In certain embodiments, image sensor 202 receives light projected through lens 200 and converts the light to data representing an image. Image sensor 202 may be, for example, an optical sensor. FIGS. 13-15 illustrate example mobile devices with example cameras including example optical sensors (e.g., optical sensor 1964). Image sensor 202, along with circuitry 204 coupled to the image sensor, may generate one or more images or video captured by the image sensor. In some embodiments, the images or video are displayed on a display of device 100 or stored in a memory of the device.

Returning to FIG. 1, in the illustrated embodiment, device 100 includes depth imaging system 104. Depth imaging system 104 may implement one or more depth sensing technologies to determine depth at one or more different points in a scene that is being captured by camera 102. Examples of depth sensing technologies that may be implemented in depth imaging system 104 include, but are not limited to, stereoscopic depth, structured pattern illumination, illuminating in a fixed pattern, scanning illumination (e.g., scanning a line across a field-of-view), and direct or indirect time-of-flight.

In certain embodiments, depth imaging system 104 is a time-of-flight (ToF) imaging system. In a ToF imaging system, the imaging system may illuminate a scene (e.g., a field of view of camera 102) in front of device 100 (e.g., a subject in the field of view being captured by camera 102) with illumination. In some embodiments, the illumination includes patterned illumination. Patterned illumination may include, for example, a plurality of dots, spots, lines, or other shaped objects projected simultaneously in a pattern. For scanning illumination, one or more objects (e.g., lines) may be scanned across a field-of-view of depth imaging system 104. The pattern or scan produced by depth imaging system 104 may be a predetermined and known pattern/scan generated by an illuminator in the ToF imaging system. The illuminator may be, for example, a laser illuminator or LED illuminator. In certain embodiments, illumination from the ToF imaging system is invisible to the naked eye of a user. For example, the illumination may be infrared (IR) illumination or another illumination with a wavelength outside the visible wavelength range. Illumination outside the visible wavelength range may be implemented to prevent ambient light from affecting operation of the system. An example of a ToF imaging system is described in U.S. Patent Application Publication No. 2018/0209846 to Mandai et al., which is incorporated by reference as if fully set forth herein.

Figure 3:
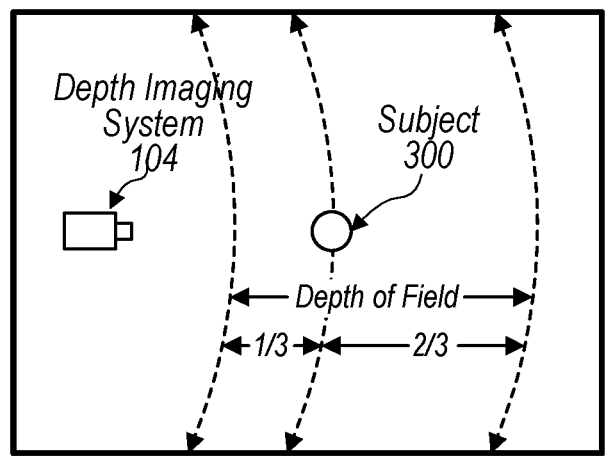
FIG. 3 depicts a top view representation of an embodiment of a depth imaging system determining depth of a subject.

FIG. 3 depicts a top view representation of an embodiment of depth imaging system 104 determining depth of subject 300. In the illustrated embodiment, depth imaging system 104 is a ToF imaging system. Depth imaging system 104 measures a time that each light object takes to return to the depth imaging system (e.g., the time-of-flight of each light object) when subject 300 is illuminated by the depth imaging system. Subject 300 may be, for example, in the field of view being captured by camera 102. Distance between subject 300 and device 100 (e.g., depth imaging system 104) may be determined based on the time-of-flight measurements.

In various embodiments, a light pattern may be received by the ToF imaging system after illuminating the field of view with patterned illumination. For example, the patterned illumination may include a point cloud pattern of spots. A reflected pattern of spots may be received by depth imaging system 104. Individual spots have time-of-flight values (e.g., times between transmission and receiving of the individual spots) that are determined by the distance between the subject reflecting the light and depth imaging system 104 (e.g., the distance between depth imaging system 104 and subject 300, shown in FIG. 3). Various analysis techniques may be implemented to determine depth of subject 300 using a time-of-flight system.

In some embodiments, various criteria are applied to the time-of-flight values of the spots to determine a confidence level in the time-of-flight values of the spots. The confidence level in the spots may be used to decide whether there is sufficient data in the spots to accurately determine the distance between the subject and depth imaging system 104. For instance, an accuracy level in determining the focus position by the ToF-AF system may be below a predetermined level when the confidence level in the spots is low. Examples of criteria that may be applied to the time-of-flight values of the spots to determine the confidence of the spots include, but are not limited to, signal intensity, contrast, responsivity, integration time (related to determination of time-of-flight) or other factors.

In some embodiments, a signal-to-noise ratio (SNR) may also be determined for the spots in order to determine whether there is sufficient data to accurately determine the distance between the subject and depth imaging system 104. For instance, the higher the confidence in a spot, the higher the SNR for the spot. Confidence and SNR data may be utilized to determine the spots used for depth determination. For example, only spots with high confidence and high SNR may be used for determining depth (e.g., only spots with confidence and SNR above predetermined threshold levels or within predetermined ranges are used for determining depth). Utilizing only spots with high confidence and high SNR may increase the accuracy and stability in determining depth from the spots.

When there is sufficient data in the spots to determine distance between the subject and depth imaging system 104 (e.g., when an accuracy level in determining the focus position by the ToF-AF system is above a predetermined level), the depth imaging system may determine the depth of the in order to determine a focus position (e.g., a position of one or more lenses) for camera 102. For example, depth imaging system 104 may implement a depth-to-position model or another model that translates depth of the subject to focus position for camera 102. Accordingly, depth imaging system 104 on device 100, as shown in FIG. 1, may allow the device to implement ToF autofocusing (ToF-AF) for camera 102 in addition to autofocus processes using the camera itself (e.g., PDAF or CBAF).

In various embodiments, there may be insufficient data in the spots to determine the distance between the subject and depth imaging system 104 using the time-of-flight values (e.g., an accuracy level in determining the focus position by the ToF-AF system is below a predetermined level). For instance, if the subject is in close proximity to depth imaging system 104, the sensors (e.g., single-photon avalanche diodes (SPADs)) in the depth imaging system may become saturated with spot signals and be unable to determine time-of-flight values with any accuracy or confidence (e.g., there is low confidence and/or low SNR in the spots). Conversely, when the subject is too far from depth imaging system 104, the sensors may receive little to no spot data, which is insufficient to determine any time-of-flight values with any accuracy or confidence. In various embodiments, a ToF-AF system has a workable distance range (where data is typically sufficient to determine time-of-flight values) that ranges between about 30 cm (near distance) and about 5 m (far distance). In embodiments where there is insufficient data to determine time-of-flight values (e.g., a subject is less than 30 cm or greater than 5 m from depth imaging system 104), the depth imaging system may determine to place camera 102 at hyperfocal (e.g., infinite focus) without any additional information.

While placing camera 102 at hyperfocal may be suitable for instances when there are no objects in front of the camera (e.g., when capturing a night sky or an object at a large distance from the camera), for close-in objects, setting the camera at hyperfocal will typically result in the camera not being able to focus on subjects. When a subject is close-in to camera 102 and depth imaging system 104 (e.g., less than 30 cm), a CBAF scan may be suitable for determining focus position for the camera (as PDAF is typically not suitable for a close-in subject as the subject will typically appear flat and without texture at such distances).

In some embodiments, a CBAF scan may be implemented when the ToF-AF system (e.g., depth imaging system 104) has data indicating that a subject has moved from far (and detectable distances) to near (and indeterminable distances). For example, if an object (e.g., the subject) moves from a detectable distance (such as 100 cm) to an undetectable distance (such as 20 cm), the ToF-AF system may detect that the distance of the object crosses a minimum detectable distance (such as 30 cm) of the ToF-AF system over a period of time. In such instances, the movement of the object across the minimum detectable distance threshold from near to far over the period of time may be an indication to the ToF-AF system and the camera system that a CBAF scan should be implemented to determine focus position. In various embodiments, the minimum detectable distance is a predetermined distance as the minimum detectable distance can be determined during manufacturing or testing of a particular ToF-AF system and implemented for operation of the ToF-AF system.

Situations may occur, however, where the ToF-AF system cannot detect that an object or subject has moved across the minimum detectable distance threshold. For example, a problematic situation may be when an object is introduced into the field-of-view of the ToF-AF system at a distance that is less than the minimum detectable distance. In such an instance, the ToF-AF system may be "blind" as to whether the object is close too or far away from the system. Accordingly, the ToF-AF system may assume that the object is far and set the focus position for the camera system at hyperfocal (infinite focus). As the object is actually close to the camera, any images captured will typically be out of focus with focus position for the camera set at hyperfocal. Such situations may occur more frequently with the implementation of wide and super-wide lenses on camera systems as the wide and super-wide lenses allow camera systems to capture images of close-in objects. A proximity sensor may be used in such situations to detect close-in objects and their distances; however, as discussed above, implementing a proximity sensor in device 100 creates additional cost in manufacturing and area on the device.

The present disclosure recognizes that an existing detector on device 100 that is independent of the ToF-AF system may be leveraged to overcome the problems of close-in object detection using ToF-AF without the additional cost of a proximity sensor. For example, an existing detector that is capable of detecting light illuminated by the ToF-AF system (e.g., infrared (IR) light) may be leveraged for close-in object detection. As discussed above, a ToF-AF system typically includes sensors (e.g., SPADs) that are capable of detecting time-of-flight values based on illumination provided by the ToF-AF system. SPAD sensors are capable of determining a timing of the signal received (e.g., the timing of reflected spots in the illumination) but are generally not capable of receiving any information on intensity of the signal itself and thus cannot be used to make determinations of an amount of illumination (signal) received by the sensors. Accordingly, an existing detector that has sensor channels capable of measuring illumination signals (e.g., IR signals) may be implemented to determine an amount of illumination received from reflection off an object of the light generated by the ToF-AF system. The amount of illumination received may then be utilized to determine or approximate a distance of the object, as described herein.

Figure 4:
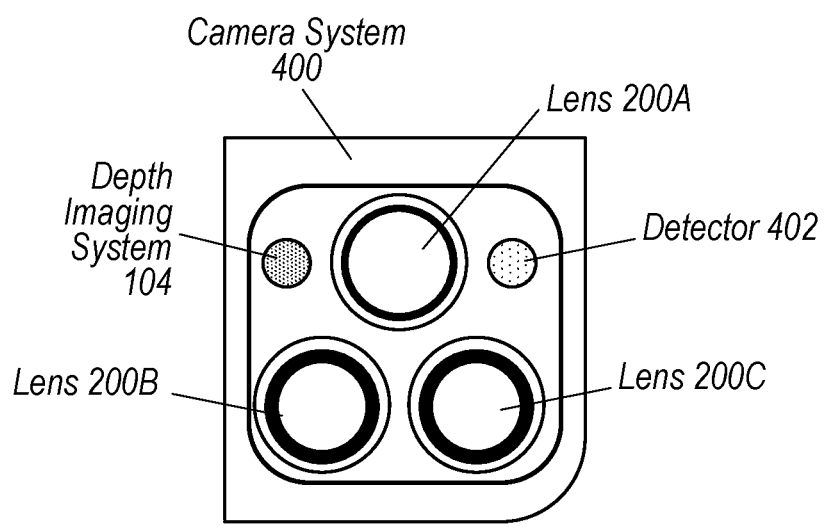
FIG. 4 depicts a representation of an embodiment of a camera system on a mobile device.

FIG. 4 depicts a representation of an embodiment of camera system 400 on mobile device 100. In the illustrated embodiment, camera system 400 includes lenses 200, depth imaging system 104, and detector 402. In various embodiments, detector 402 is independent of depth imaging system 104. As used herein, detector 402 being "independent" of depth imaging system 104 refers to detector 402 being located in a module housing that is separate of a module housing for depth imaging system 104 on device 100. For example, depth imaging system 104 may include an illuminator and a ToF detector in a single module housing on device 100 while detector 402 is included in a separate, independent module housing on the device. In some embodiments, detector 402 may be referred to as "independent" when an aperture for detector 402 is separately located on device 100 from an aperture of depth imaging system 104.

In certain embodiments, detector 402 is a flicker detector. Flicker detectors are typically included in the camera systems of many current mobile devices to provide detection for automatic white balancing (AWB) or autoexposure (AE) determination in the camera systems. Detector 402 may, however, include any detector having one or more sensors capable of receiving IR signals (or another wavelength emitted by depth imaging system 104). While detector 402 is referenced herein as an existing detector on camera system 400, it is to be understood that embodiments may be contemplated where detector 402 is a detector added to the camera system. For example, detector 402 may be an inexpensive and low-area cost detector added to camera system 400.

In the illustrated embodiment, lenses 200 includes three lenses 200A, 200B, 200C. Embodiments with other numbers of lenses may, however, also be contemplated. In certain embodiments, lenses 200A, 200B, 200C include a telephoto lens, a wide-angle lens, and a super-wide-angle lens. In various embodiments, lenses 200, depth imaging system 104, and detector 402 are placed in close proximity to each other such that the components have similar field-of-views in camera system 400. For example, lenses 200, depth imaging system 104, and detector 402 may be positioned within about 2-3 cm of each other.

In certain embodiments, detector 402 includes at least one sensor (e.g., photodiode) capable of receiving illumination at a wavelength of depth imaging system 104 (the ToF-AF system). For instance, detector 402 may have at least one IR sensor. Detector 402 may also include other sensors capable of detecting illumination at other wavelengths or combinations of wavelengths (e.g., a sensor may detect visible wavelengths or a combination of visible and IR wavelengths).

In embodiments where an object (subject) is close to camera system 400, detector 402 may receive a reflected illumination signal from the illumination emitted by depth imaging system 104. As the illumination emitted by depth imaging system 104 may be periodic illumination emitted at a specific frequency, any illumination signal from reflection off an object or subject should have the same specific frequency. Accordingly, if detector 402 is picking up IR illumination originating from depth imaging system 104, the frequency of the reflected illumination signal received by detector 402 should substantially match the frequency of illumination provided by depth imaging system 104.

Figure 6:
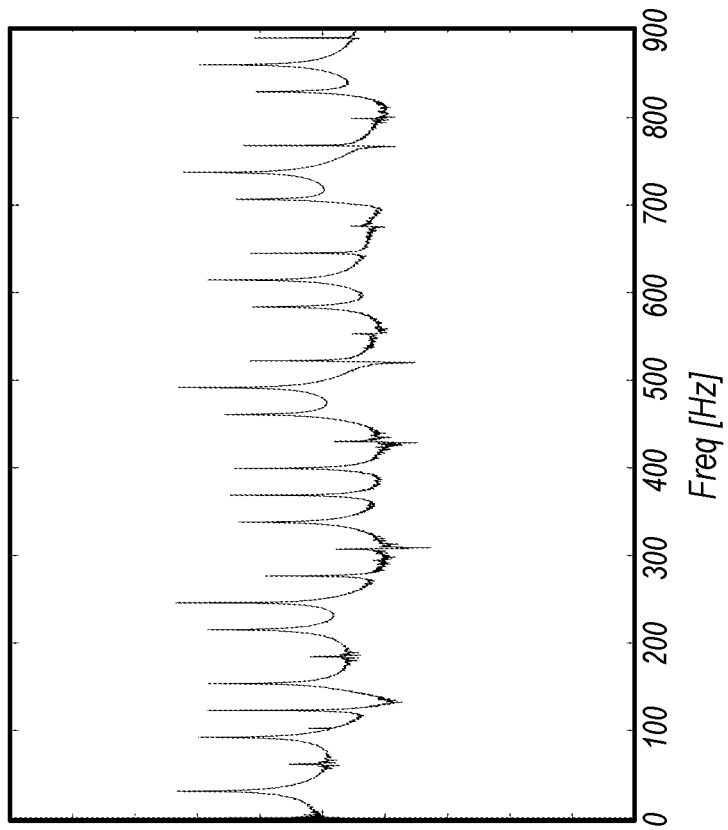
FIG. 6 depicts an example of the IR signal of FIG. 5 transformed into the frequency domain.
Figure 5:
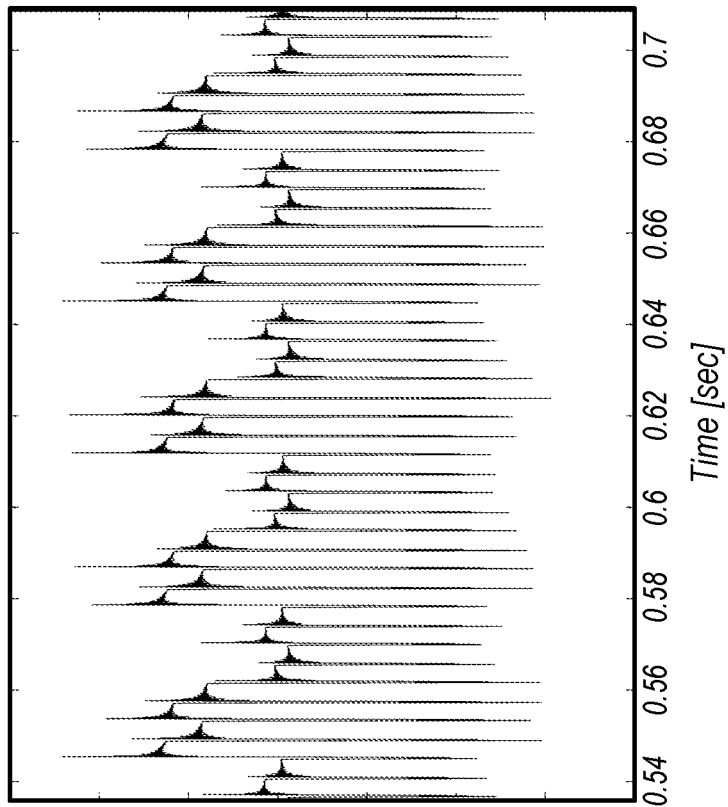
FIG. 5 depicts an example of an IR signal received by a detector over a period of time.
Figure 8:
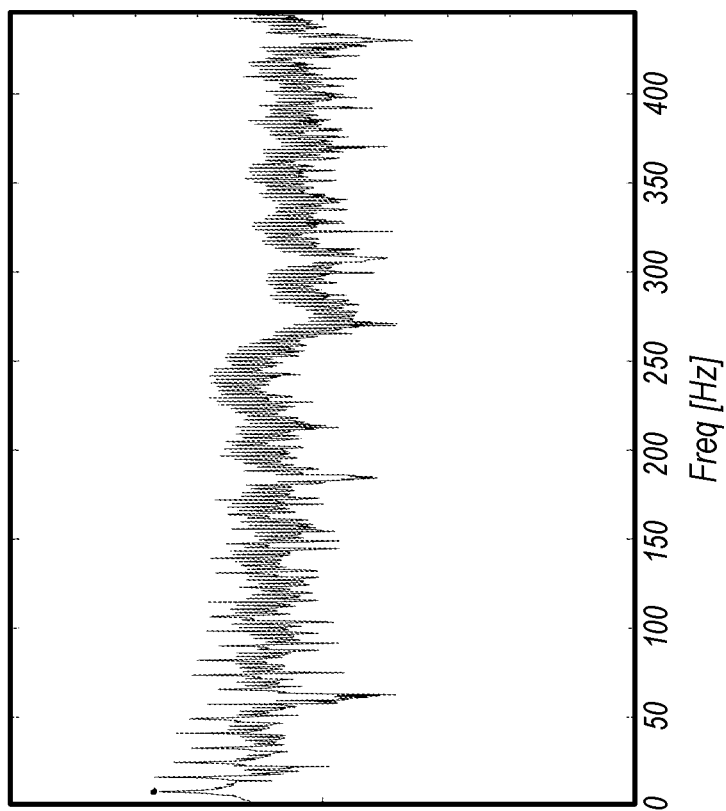
FIG. 8 depicts an example of the IR signal of FIG. 7 transformed into the frequency domain.
Figure 7:
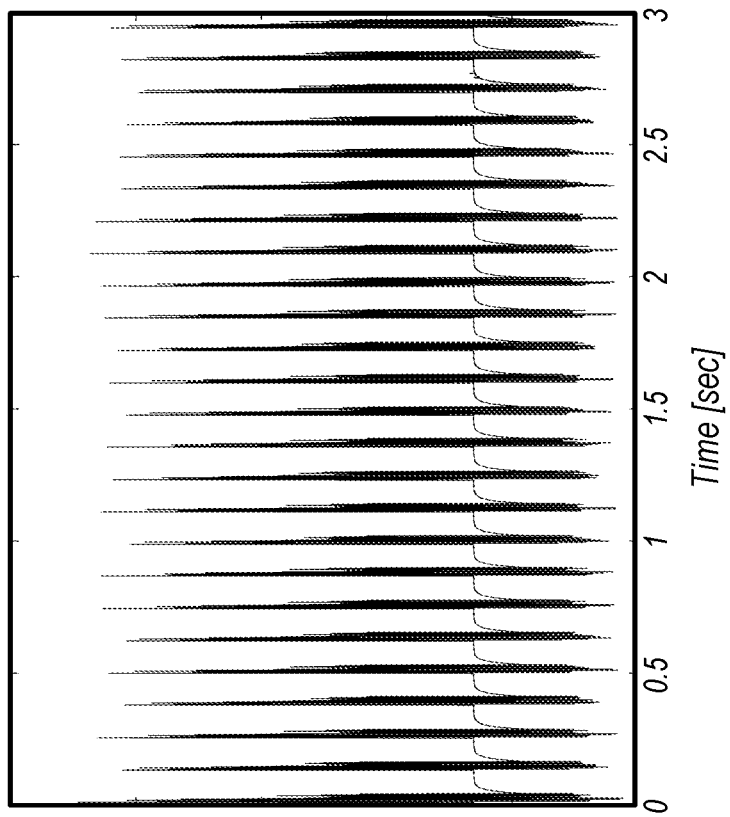
FIG. 7 depicts another example of an IR signal received by a detector over a period of time.

FIG. 5 depicts an example of an IR signal received by detector 402 over a period of time when depth imaging system 104 is emitting IR illumination at about 30 Hz towards a near distance object. The near distance object may be, for example, at a distance less than about 30 cm. FIG. 6 depicts an example of the IR signal of FIG. 5 transformed into the frequency domain. FIG. 7 depicts an example of an IR signal received by detector 402 over a period of time when depth imaging system 104 is emitting IR illumination at about 8 Hz towards the near distance object. FIG. 8 depicts an example of the IR signal of FIG. 7 transformed into the frequency domain. As shown in FIGS. 5-8, the IR signal received by detector 402 has the same frequency (either about 30 Hz or about 8 Hz) as the illumination of depth imaging system 104. Thus, detector 402 is capable of receiving illumination from depth imaging system 104 reflecting off a near distance object.

Turning back to FIG. 4, in various embodiments, analysis of the reflected illumination (IR) signal received by detector 402 when the ToF-AF system (depth imaging system 104) is active may be implemented to determine information about a position of an object in front of camera system 400.

In certain embodiments, analysis of the reflected illumination (IR) signal received by detector 402 includes assessing a power ratio in the reflected illumination signal. In some embodiments, the power ratio is a ratio of direct current (DC) to alternating current (AC) in the reflected illumination signal. The power ratio may be determined by assessing the reflected illumination signal in either the time domain or the frequency domain. For instance, in the frequency domain, the power ratio (DC to AC ratio) may be a ratio of the sum of harmonics in the signal over the sum of low frequency information in the signal. The following is an equation that may be used to determine the DC to AC ratio in a reflected illumination signal in the frequency domain.

$$R_{\frac{DC}{AC}} = -10\log_{10}\left(\frac{\sum_{k=3}^{N} P_{(kF_0)}^2}{\sum_{k=\{0,1,2,3,4\}} P_k^2}\right); \quad \text{(Equation 1)}$$

where $P_k$ is the magnitude at frequency, k, and $F_0$ is the time-of-flight IR signal fundamental frequency. It should be understood that Equation 1 is provided as one example of a technique for determining the DC to AC ratio in an illumination signal in the frequency domain and that other techniques known in the art may be implemented to determine the DC to AC ratio, either in the frequency domain or the time domain.

Figure 9:
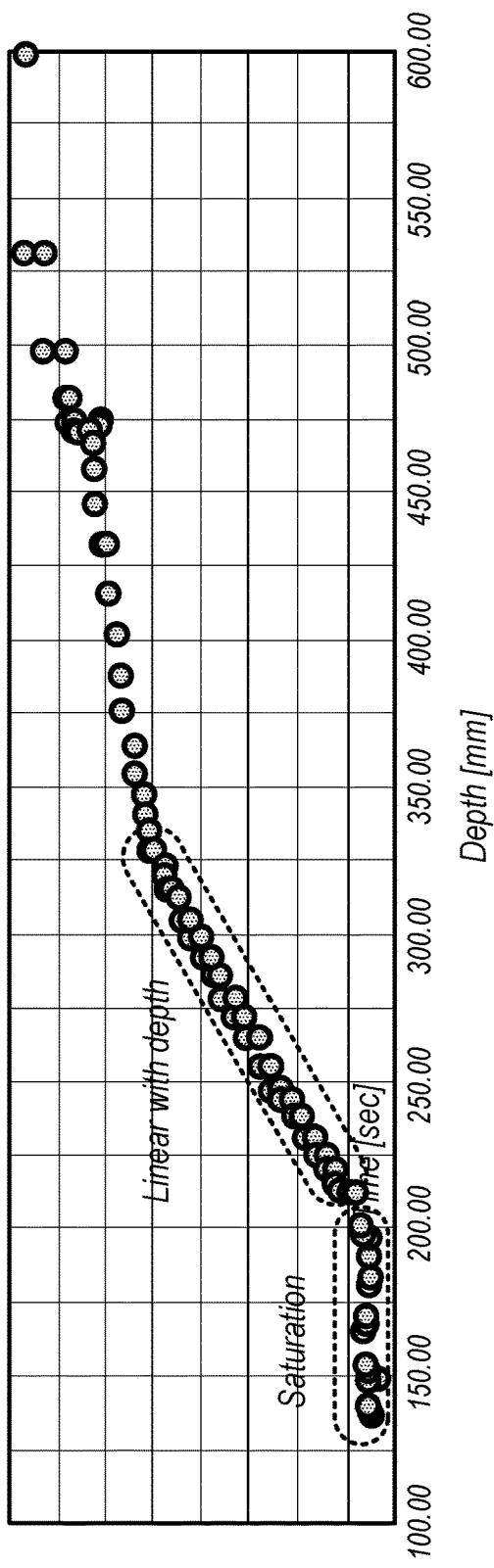
FIG. 9 depicts an example plot of the DC to AC ratio measured in a reflected illumination signal versus depth.

It has been determined that for implementations with depth imaging system 104 and detector 402, the power ratio (e.g., the DC to AC ratio) in the signal received at the detector varies with distance of the object reflecting the time-of-flight illumination signal onto detector 402 when the object is close to device 100. FIG. 9 depicts an example plot of the DC to AC ratio measured in a reflected illumination signal versus depth. The points in the plot are DC to AC ratios determined from measurements of the reflected illumination signal from time-of-flight illumination reflection off a white wall using an embodiment of device 100 with depth imaging system 104 and detector 402. DC to AC ratios are determined for various depths (distances) of the white wall from device 100.

As shown in FIG. 9, as the object (e.g., the white wall) gets within a certain range of device 100 (below approximately 550-600 mm in the plot), the DC to AC ratio begins to decrease with decreasing distance of the object. As distance continues to decrease, the relationship between DC to AC ratio and depth becomes linear in nature in a distance range (e.g., in the range between about 200 mm and about 300 mm). At a much closer distance (e.g., below about 200 mm), the reflected illumination signal (and thus, the DC to AC ratio) becomes saturated and the DC to AC ratio does not vary with distance.

In various embodiments, as shown in FIG. 9, the distance range with the linear relationship between DC to AC ratio and distance overlaps with the minimum detectable distance of depth imaging system 104 (e.g., the ToF-AF system). Accordingly, the range with a linear relationship between DC to AC (power) ratio and depth may be utilized to determine whether an object is within a specific distance of device 100 (e.g., within the minimum detectable distance of depth imaging system 104) based on a DC to AC ratio measured in a reflected illumination signal. For instance, a specified distance (such as the minimum detectable distance of depth imaging system 104) may be correlated to a specified DC to AC ratio based on the linear relationship.

Figure 10:
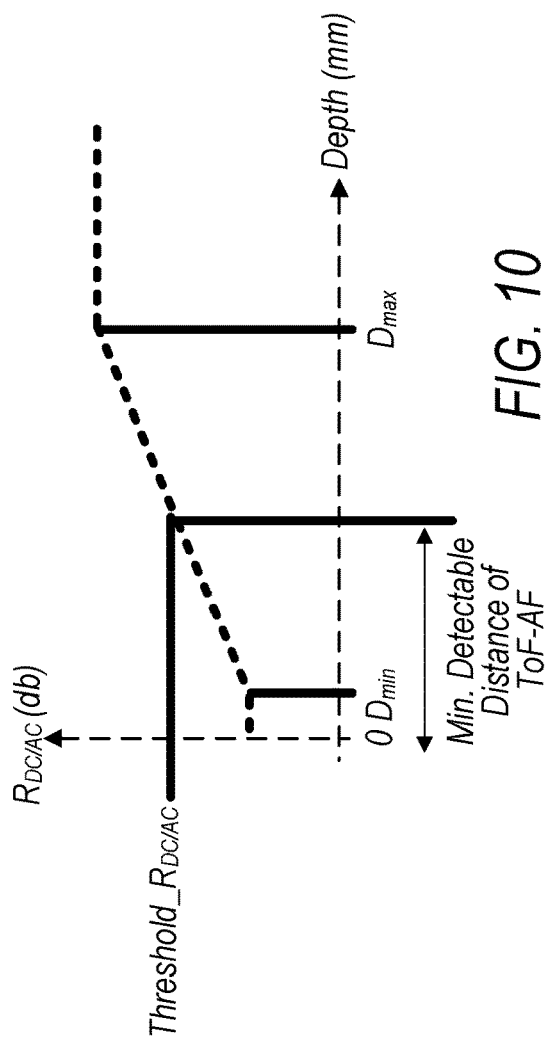
FIG. 10 depicts an example of a conceptual plot of DC to AC ratio ("Rpc/Ac") versus depth.

FIG. 10 depicts an example of a conceptual plot of DC to AC ratio ("Roc/Ac") versus depth (e.g., distance from device 100). The plot in FIG. 10 depicts a relationship between DC to AC ratio that is similar to the measured relationship shown in FIG. 9. In certain embodiments, a relationship between DC to AC ratio and depth, such as depicted in FIG. 10, is used to determine whether an object is within a specific distance of device 100. For example, based on the linear relationship between DC to AC ratio and depth, a threshold (e.g., "Threshold RDC/AC" in FIG. 10) for the DC to AC ratio may be determined. In certain embodiments, the threshold (e.g., the predetermined threshold) is the DC to AC ratio that correlates to the minimum detectable distance of depth imaging system 104 (e.g., the ToF-AF system). Other techniques for determining a threshold for the DC to AC ratio may also be contemplated.

Figure 11:
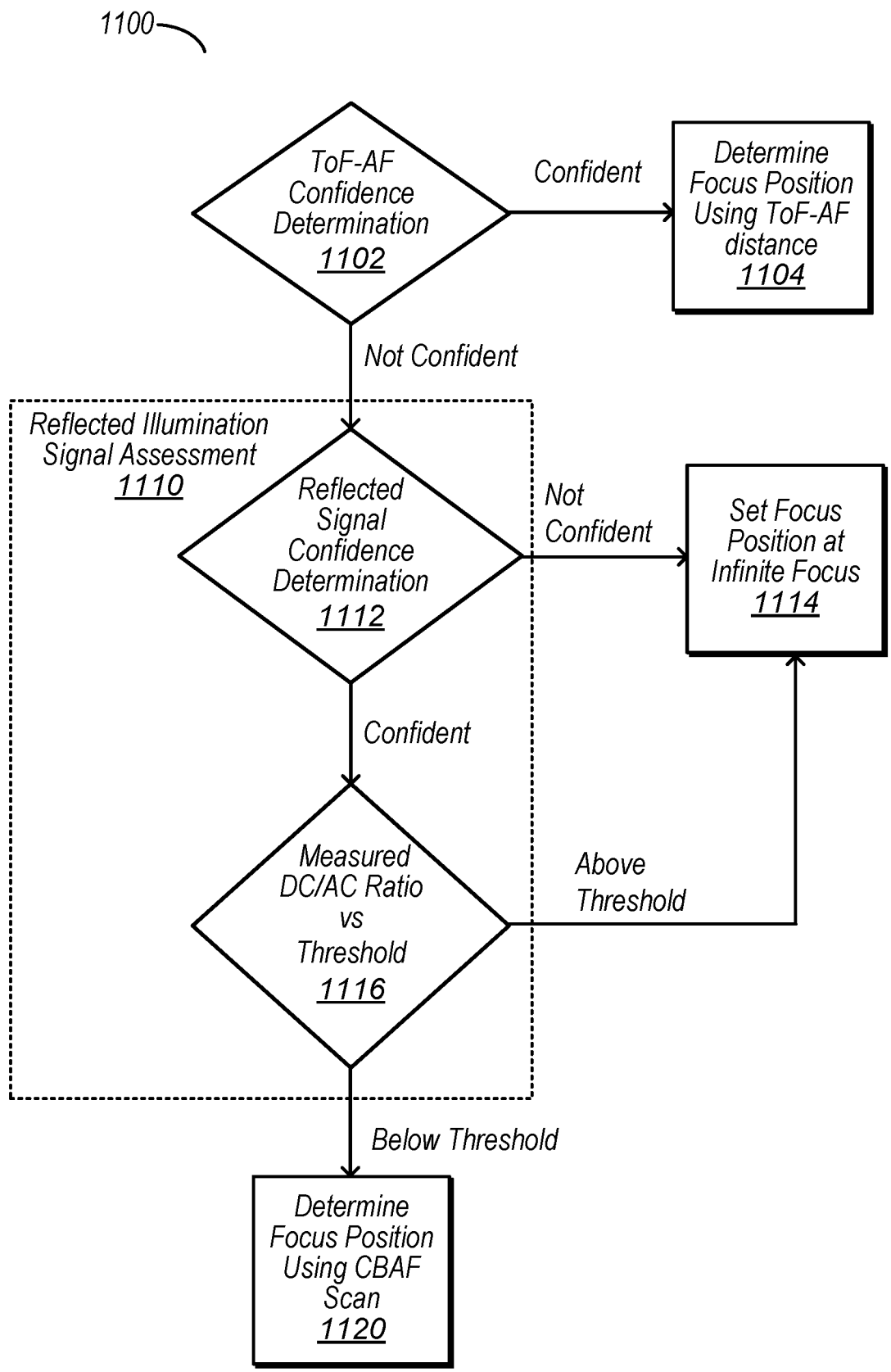
FIG. 11 depicts a flowchart representation of an embodiment of a focus process.

FIG. 11 depicts a flowchart representation of an embodiment of a focus process. In various embodiments, focus process 1100 is an autofocus process implemented to determine a focus position for camera 102. In the illustrated embodiment, focus process 1100 begins in 1102 with depth imaging system 104 (e.g., the ToF-AF system) making a determination of whether or not the depth imaging system is confident and has sufficient data in the spots to assess a distance of a subject. For example, in 1102, depth imaging system 104 may determine whether one or more criteria are met that indicate the system has sufficient data, as described above. When depth imaging system 104 is confident, a focus position for camera 102 may be determined based on the distance of a subject determined by the depth imaging system in 1104.

In various embodiments, when depth imaging system 104 is not confident (e.g., when the ToF-AF process has insufficient data to determine a subject's distance), focus process 1100 includes an assessment of an illumination signal reflected from depth imaging system and measured by detector 402 for focus position determination (shown as reflected illumination signal assessment 1110 in FIG. 11). Reflected illumination signal assessment 1110 may be implemented to determine whether an object (e.g., a surface of an object) is within a predetermined distance from device 100 (e.g., within the minimum detectable distance of depth imaging system 104). In certain embodiments, reflected illumination signal assessment 1110 includes an assessment of a confidence in the reflected (illumination) signal in 1112. As described herein, the measured DC to AC ratio is determined from a measurement of the reflected illumination signal received in detector 402. In some embodiments, a confidence level of the reflected illumination signal is determined before assessing the DC to AC ratio versus the threshold. The confidence level in the reflected illumination signal may correspond to a measure of the confidence in the measured DC to AC ratio. The confidence level in the reflected illumination signal may be determined, for example, based on a signal-to-noise (SNR) measurement in the reflected illumination signal or other factors that determine confidence in the signal. In the illustrated embodiment, the camera system may be set at infinite focus (hyperfocal) in 1114 when there is no confidence in the reflected illumination signal (e.g., when the SNR in the reflected illumination signal is below a threshold for SNR).

When there is confidence in the reflected illumination signal (e.g., when the SNR is above the threshold for SNR), the measured DC to AC ratio (e.g., the power ratio) in the reflected illumination signal measured by detector 402 may be assessed versus a threshold (e.g., a predetermined threshold for the DC to AC ratio) in 1116. As described above, the threshold may correlate to the minimum detectable distance of depth imaging system 104. Accordingly, the measured DC to AC ratio being below the threshold is an indication that an object (e.g., subject) is close to the camera system (e.g., at a distance less than the minimum detectable distance of depth imaging system 104). It should be noted that while FIG. 11 depicts the confidence in the reflected illumination signal being determined before the measured DC to AC ratio is assessed versus the threshold, embodiments may be contemplated where the assessment of the measured DC to AC ratio versus the threshold is implemented before the assessment of the confidence.

As the object is at a close distance to camera system, setting the focus position of the camera system at infinite focus may render the object out of focus. To place the object in focus, another autofocus process (e.g., an autofocus process other than ToF-AF) may be implemented by the camera system. In certain embodiments, as shown in FIG. 11, when the measured DC to AC ratio is below the threshold, a CBAF scan is implemented to determine a focus position for the camera system in 1120. A CBAF scan may implemented as the CBAF scan is capable of determining autofocus at any distance.

In some embodiments, the measured DC to AC ratio being above the threshold is an indication that the object (e.g., the subject) is far away from the camera system (e.g., at a distance outside a detectable range of depth imaging system 104 and detector 402). For example, the measured DC to AC ratio being above the threshold may be an indication that a user is trying to capture an image of a night sky or some other far away scene in which a CBAF process cannot determine autofocus. Accordingly, in such embodiments, the camera system may be set at infinite focus (hyperfocal) in 1114. Setting the camera system at infinite focus may allow proper image capture of the night sky or far away scene.

As described herein, a DC to AC (power) ratio determined from measurements of reflected illumination by a detector (e.g., detector 402) that is separate from a ToF-AF system (e.g., depth imaging system 104) may be implemented in making a determination of object distance when the ToF-AF system cannot accurately determine the distance. Implementing the measurement of the DC to AC ratio by the detector may provide knowledge about a distance of an object (e.g., subject) from a camera system that otherwise would not be available to the camera system. Thus, the distance of an object determined by the detector is useful to avoid capturing out of focus images when objects are close to the camera system and the distance is undetectable by the ToF-AF system. In a particular example, detecting when an object is close based on measurements of reflected illumination by a detector is useful when the object is suddenly introduced into a field-of-view of the camera system. In such an example, the ToF-AF system has no temporal data of object distance and thus is unable to determine autofocus for the camera system.

Determining the distance by the detector may be particularly useful in camera systems that have wide or super-wide lenses. For example, in various embodiments, a camera system has both wide-angle and super-wide-angle lenses (such as camera system 400, shown in FIG. 4). In such embodiments, when an object gets close to the camera system (such as closer than the minimum detectable distance of depth imaging system 104), parallax between a wide-angle lens and a super-wide-angle lens may become problematic (e.g., the wide-angle lens and the super-wide-angle lens begin to see different things in their field-of-view). Thus, knowledge of whether an object is close to camera system 400 or not may be useful in camera systems with both wide-angle and super-wide-angle lenses.

For example, in many instances, a wide-angle lens is capable of determining autofocus using a PDAF process while a super-wide-angle lens has no capability for PDAF. In such instances, the autofocus determined using the wide-angle lens and PDAF is translated to the super-wide-angle lens. When the object is close and parallax becomes an issue, however, translation of the autofocus from the wide-angle lens to the super-wide-angle lens is not desirable since the lenses are capturing different fields-of-view. Accordingly, in some embodiments, the determination of how close an object is based on the reflected illumination signal received by detector 402 (when the ToF-AF system is not confident) may provide an indication to implement CBAF for the super-wide-angle lens instead of translating the autofocus for the wide-angle lens determined by PDAF.

Various embodiments may also be contemplated where the linear relationship between the DC to AC (power) ratio and distance (such as shown in FIGS. 9 and 10) is implemented to provide a measure of distance based on a measured DC to AC ratio. For example, in some embodiments, a calibration curve of distance versus DC to AC ratio may be generated. The calibration curve may be implemented by a camera system (e.g., camera system 400) to determine a distance of an object based on a measured DC to AC ratio. The distance determined from the calibration curve may then be utilized by the camera system to determine a focus position for the camera system. In such embodiments, a calibration curve may be generated on a per device basis. For instance, the calibration curve may be determined from measurements made during manufacture of a device. Implementation of the calibration curve may, however, depend on an accuracy in the relationship between distance and the DC to AC ratio.

Example Method

FIG. 12 is a flow diagram illustrating a method for implementing a focus process, according to some embodiments. Method 1200 shown in FIG. 12 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In various embodiments, some or all elements of this method may be performed by a particular device, such as mobile device 2300, described below.

At 1202, in the illustrated embodiment, a time-of-flight system on a device transmits an infrared light signal.

At 1204, in the illustrated embodiment, an infrared detector on the device, which is independent of the time-of-flight system, receives a reflected infrared signal where the reflected infrared signal includes infrared light from the time-of-flight system reflected off at least one surface positioned in a field-of-view of the infrared detector and the time-of-flight system.

At 1206, in the illustrated embodiment, the reflected infrared signal received by the infrared detector is assessed to determine whether the at least one surface is within a predetermined distance from the device. In some embodiments, a power ratio in the reflected infrared signal is determined where the power ratio is determined based on an amount of the reflected infrared signal received over a period of time and the power ratio is assessed to a predetermined threshold to determine whether to implement an autofocus process for a camera system on the device. In some embodiments, the power ratio is a direct current (DC) to alternating current (AC) ratio in the reflected infrared signal determined in the frequency domain.

Example Mobile Device

FIGS. 13-15 illustrate embodiments of mobile device 2300 that may include one or more cameras, in accordance with embodiments as described above. In some embodiments, device 2300 may include one or multiple features, components, and/or functionality of embodiments described herein.

FIG. 13 illustrates that a "front" side of device 2300 may have touch screen 2312. Touch screen 2312 may display one or more graphics within a user interface (UI). In this embodiment, as well as others described below, a user may select one or more of the graphics by making a gesture on the graphics, for example, with one or more fingers 2301 (not drawn to scale in the figure) or one or more styluses 2307 (not drawn to scale in the figure).

Device 2300 may also include one or more physical buttons, such as "home" or menu button 2315, which may be used to navigate to any application 2336 (see FIG. 15) in a set of applications that may be executed on device 2300. Alternatively, in some embodiments, the menu button is implemented as a soft key in a graphics user interface (GUI) displayed on touch screen 2312.

In one embodiment, device 2300 includes touch screen 2312, menu button 2315, push button 2305 for powering the device on/off and locking the device, volume adjustment button(s) 2309, Subscriber Identity Module (SIM) card slot 2369, head set jack 2314, and docking/charging external port 2324, in accordance with some embodiments. Push button 2305 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 2300 also may accept verbal input for activation or deactivation of some functions through microphone 2313.

FIG. 13 illustrates that the "front" side of device 2300 may include camera 2370, in accordance with some embodiments. FIG. 14 illustrates that a "rear" side of device 2300 may include camera 2370, in accordance with some embodiments. Camera 2370, which may be referred to as an "optical sensor" for convenience, may also be known as or called an optical sensor system. Camera 2370 may include one or more camera modules. FIG. 14 further illustrates camera 2370 includes optical sensor 2364 and light source module 2375. Light source module 2375 may include, for example, one or more internal strobes.

Referring to FIG. 15, a block diagram illustrates that device 2300 may include memory 2302 (which may include one or more computer readable storage mediums), memory controller 2322, one or more processing units (CPU's) 2320, peripherals interface 2318, RF circuitry 2308, audio circuitry 2310, speaker 2311, touch-sensitive display system 2312, microphone 2313, input/output (I/O) subsystem 2306, other input control devices 2316, and external port 2324. Device 2300 may include one or more optical sensors 2364. These components may communicate over one or more communication buses or signal lines 2303.

It should be appreciated that device 2300 is only one example of a portable multifunction device, and that device 2300 may have more or fewer components than shown, may combine two or more components, or may have a different configuration or arrangement of the components. The various components shown in FIG. 15 may be implemented in hardware, software, or a combination of hardware and software, including one or more signal processing and/or application specific integrated circuits.

Memory 2302 may include high-speed random access memory and may also include non-volatile memory, such as one or more magnetic disk storage devices, flash memory devices, or other non-volatile solid-state memory devices. Access to memory 2302 by other components of device 2300, such as CPU 2320 and the peripherals interface 2318, may be controlled by memory controller 2322.

Peripherals interface 2318 can be used to couple input and output peripherals of the device to CPU 2320 and memory 2302. The one or more processors 2320 run or execute various software programs and/or sets of instructions stored in memory 2302 to perform various functions for device 2300 and to process data.

In some embodiments, peripherals interface 2318, CPU 2320, and memory controller 2322 may be implemented on a single chip, such as chip 2304. In some other embodiments, they may be implemented on separate chips.

RF (radio frequency) circuitry 2308 receives and sends RF signals, also called electromagnetic signals. RF circuitry 2308 converts electrical signals to/from electromagnetic signals and communicates with communications networks and other communications devices via the electromagnetic signals. RF circuitry 2308 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 2308 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 2310, speaker 2311, and microphone 2313 provide an audio interface between a user and device 2300. Audio circuitry 2310 receives audio data from peripherals interface 2318, converts the audio data to an electrical signal, and transmits the electrical signal to speaker 2311. Speaker 2311 converts the electrical signal to human-audible sound waves. Audio circuitry 2310 also receives electrical signals converted by microphone 2313 from sound waves. Audio circuitry 2310 converts the electrical signal to audio data and transmits the audio data to peripherals interface 2318 for processing. Audio data may be retrieved from and/or transmitted to memory 2302 and/or RF circuitry 2308 by peripherals interface 2318. In some embodiments, audio circuitry 2310 also includes a headset jack (e.g., 2314, FIGS. 13-14). The headset jack provides an interface between audio circuitry 2310 and removable audio input/output peripherals, such as output-only headphones or a headset with both output (e.g., a headphone for one or both ears) and input (e.g., a microphone).

I/O subsystem 2306 couples input/output peripherals on device 2300, such as touch screen 2312 and other input control devices 2316, to peripherals interface 2318. I/O subsystem 2306 may include display controller 2356 and one or more input controllers 2360 for other input or control devices. The one or more input controllers 2316 receive/send electrical signals from/to other input or control devices 2316. The other input control devices 2316 may include physical buttons (e.g., push buttons, rocker buttons, etc.), dials, slider switches, joysticks, click wheels, and so forth. In some alternative embodiments, input controller(s) 2360 may be coupled to any (or none) of the following: a keyboard, infrared port, USB port, and a pointer device such as a mouse. The one or more buttons (e.g., 2309, FIGS. 13-14) may include an up/down button for volume control of speaker 2311 and/or microphone 2313. The one or more buttons may include a push button (e.g., 2306, FIGS. 13-14).

Touch-sensitive display 2312 provides an input interface and an output interface between the device and a user. Display controller 2356 receives and/or sends electrical signals from/to touch screen 2312. Touch screen 2312 displays visual output to the user. The visual output may include graphics, text, icons, video, and any combination thereof (collectively termed "graphics"). In some embodiments, some or all of the visual output may correspond to user-interface objects.

Touch screen 2312 has a touch-sensitive surface, sensor or set of sensors that accepts input from the user based on haptic and/or tactile contact. Touch screen 2312 and display controller 2356 (along with any associated modules and/or sets of instructions in memory 2302) detect contact (and any movement or breaking of the contact) on touch screen 2312 and converts the detected contact into interaction with user-interface objects (e.g., one or more soft keys, icons, web pages or images) that are displayed on touch screen

2312. In an example embodiment, a point of contact between touch screen 2312 and the user corresponds to a finger of the user.

Touch screen 2312 may use LCD (liquid crystal display) technology, LPD (light emitting polymer display) technology, or LED (light emitting diode) technology, although other display technologies may be used in other embodiments. Touch screen 2312 and display controller 2356 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 2312. In an example embodiment, projected mutual capacitance sensing technology may be used.

Touch screen 2312 may have a video resolution in excess of 100 dots per inch (dpi). In some embodiments, the touch screen has a video resolution of approximately 160 dpi. The user may make contact with touch screen 2312 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 2300 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 2312 or an extension of the touch-sensitive surface formed by the touch screen.

Device 2300 also includes power system 2362 for powering the various components. Power system 2362 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

As described herein, device 2300 may include one or more cameras 2370 that include optical sensors 2364. FIG. 15 shows optical sensor 2364 coupled to optical sensor controller 2358 in I/O subsystem 2306. Optical sensor 2364 may include charge-coupled device (CCD) or complementary metal-oxide semiconductor (CMOS) phototransistors. Optical sensor 2364 receives light from the environment, projected through one or more lens, and converts the light to data representing an image. In conjunction with camera(s) 2370 (such as an embodiment of a camera described herein), optical sensor 2364 may capture still images or video. In some embodiments, an optical sensor is located on the back of device 2300, opposite touch screen display 2312 on the front of the device, so that the touch screen display may be used as a viewfinder for still and/or video image acquisition. In some embodiments, another optical sensor is located on the front of the device so that the user's image may be obtained for processing on the device (e.g., facial recognition processing) or for videoconferencing while the user views the other videoconference participants on the touch screen display.

Device 2300 may also include one or more proximity sensors 2366. FIG. 15 shows proximity sensor 2366 coupled to peripherals interface 2318. Alternatively, proximity sensor 2366 may be coupled to input controller 2360 in I/O subsystem 2306. In some embodiments, the proximity sensor turns off and disables touch screen 2312 when the multifunction device is placed near the user's ear (e.g., when the user is making a phone call).

Device 2300 includes one or more orientation sensors 2368. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 2300. In some embodiments, the one or more orientation sensors include any combination of orientation/rotation sensors. FIG. 15 shows the one or more orientation sensors 2368 coupled to peripherals interface 2318. Alternatively, the one or more orientation sensors 2368 may be coupled to an input controller 2360 in I/O subsystem 2306. In some embodiments, information is displayed on the touch screen display in a portrait view or a landscape view based on an analysis of data received from the one or more orientation sensors.

In some embodiments, the software components stored in memory 2302 include operating system 2326, communication module (or set of instructions) 2328, instructions). Furthermore, in some embodiments, memory 2302 stores device/global internal state, including information obtained from the device's various sensors and input control devices 2316; and location information concerning the device's location and/or attitude.

Operating system 2326 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 2328 facilitates communication with other devices over one or more external ports 2324 and also includes various software components for handling data received by RF circuitry 2308 and/or external port 2324. External port 2324 (e.g., Universal Serial Bus (USB), FIREWIRE, etc.) is adapted for coupling directly to other devices, in accordance with some embodiments, or indirectly over a network (e.g., the Internet, wireless LAN, etc.).

Contact/motion module 2330 may detect contact with touch screen 2312 (in conjunction with display controller 2356) and other touch sensitive devices (e.g., a touchpad or physical click wheel). Contact/motion module 2330 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 2330 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 2330 and display controller 2356 detect contact on a touchpad.

Contact/motion module 2330 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 2332 includes various known software components for rendering and displaying graphics on touch screen 2312 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 2332 stores data representing graphics to be used. Each graphic may be assigned a corresponding code. Graphics module 2332 receives, from applications etc., one or more codes specifying graphics to be displayed along with, if necessary, coordinate data and other graphic property data, and then generates screen image data to output to display controller 2356.

Text input module 2334, which may be a component of graphics module 2332, provides soft keyboards for entering text in various applications (e.g., contacts 2337, e-mail 2340, 1M 2341, browser 2347, and any other application that needs text input).

GPS module 2335 determines the location of the device and provides this information for use in various applications (e.g., to telephone 2338 for use in location-based dialing, to imaging module 2343 as picture/video metadata, and to applications that provide location-based services such as weather widgets, local yellow page widgets, and map/navigation widgets).

Applications 2336 may include the following modules (or sets of instructions), or a subset or superset thereof:
  contacts module 2337 (sometimes called an address book or contact list);
  telephone module 2338;
  video conferencing module 2339;
  e-mail client module 2340;
  instant messaging (IM) module 2341;
  workout support module 2342;
  camera module 2343 for still and/or video images;
  image management module 2344;
  browser module 2347;
  calendar module 2348;
  widget modules 2349, which may include one or more of:
    weather widget 2349-1, stocks widget 2349-2, calculator widget 2349-3, alarm clock widget 2349-4, dictionary widget 2349-5, and other widgets obtained by the user, as well as user-created widgets 2349-6;
  widget creator module 2350 for making user-created widgets 2349-6;
  search module 2351;
  video and music player module 2352, which may be made up of a video player
  module and a music player module;
  notes module 2353;
  map module 2354; and/or online video module 2355.

Examples of other applications 2336 that may be stored in memory 2302 include other word processing applications, other image editing applications, drawing applications, presentation applications, JAVA-enabled applications, encryption, digital rights management, voice recognition, and voice replication.

In conjunction with touch screen 2312, display controller 2356, contact module 2330, graphics module 2332, and text input module 2334, contacts module 2337 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 2338, video conference 2339, e-mail 2340, or IM 2341; and so forth.

In conjunction with RF circuitry 2308, audio circuitry 2310, speaker 2311, microphone 2313, touch screen 2312, display controller 2356, contact module 2330, graphics module 2332, and text input module 2334, telephone module 2338 may be used to enter a sequence of characters corresponding to a telephone number, access one or more telephone numbers in address book 2337, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 2308, audio circuitry 2310, speaker 2311, microphone 2313, touch screen 2312, display controller 2356, optical sensor 2364, optical sensor controller 2358, contact module 2330, graphics module 2332, text input module 2334, contact list 2337, and telephone module 2338, videoconferencing module 2339 includes executable instructions to initiate, conduct, and terminate a video conference between a user and one or more other participants in accordance with user instructions.

In conjunction with RF circuitry 2308, touch screen 2312, display controller 2356, contact module 2330, graphics module 2332, and text input module 2334, e-mail client module 2340 includes executable instructions to create, send, receive, and manage e-mail in response to user instructions. In conjunction with image management module 2344, e-mail client module 2340 makes it very easy to create and send e-mails with still or video images taken by imaging module 2343.

In conjunction with RF circuitry 2308, touch screen 2312, display controller 2356, contact module 2330, graphics module 2332, and text input module 2334, the instant messaging module 2341 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 2308, touch screen 2312, display controller 2356, contact module 2330, graphics module 2332, text input module 2334, GPS module 2335, map module 2354, and music player module 2346, workout support module 2342 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 2312, display controller 2356, optical sensor(s) 2364, camera(s) 2370, optical sensor controller 2358, light source module 2375 (see FIG. 14), contact module 2330, graphics module 2332, and image management module 2344, imaging module 2343 includes executable instructions to capture still images or video (including a video stream) and store them into memory 2302, modify characteristics of a still image or video, or delete a still image or video from memory 2302.

In conjunction with touch screen 2312, display controller 2356, optical sensor(s) 2364, camera(s) 2370, contact module 2330, graphics module 2332, text input module 2334, light source module 2375 (see FIG. 14), and imaging module 2343, image management module 2344 includes executable instructions to arrange, modify (e.g., edit), or otherwise manipulate, label, delete, present (e.g., in a digital slide show or album), and store still and/or video images.

In conjunction with RF circuitry 2308, touch screen 2312, display system controller 2356, contact module 2330, graphics module 2332, and text input module 2334, browser module 2347 includes executable instructions to browse the Internet in accordance with user instructions, including searching, linking to, receiving, and displaying web pages or portions thereof, as well as attachments and other files linked to web pages.

In conjunction with RF circuitry 2308, touch screen 2312, display system controller 2356, contact module 2330, graphics module 2332, text input module 2334, e-mail client module 2340, and browser module 2347, calendar module 2348 includes executable instructions to create, display, modify, and store calendars and data associated with calendars (e.g., calendar entries, to do lists, etc.) in accordance with user instructions.

In conjunction with RF circuitry 2308, touch screen 2312, display system controller 2356, contact module 2330, graphics module 2332, text input module 2334, and browser module 2347, widget modules 2349 are mini-applications that may be downloaded and used by a user (e.g., weather widget 2349-1, stocks widget 2349-2, calculator widget 2349-3, alarm clock widget 2349-4, and dictionary widget 2349-5) or created by the user (e.g., user-created widget 2349-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 2308, touch screen 2312, display system controller 2356, contact module 2330, graphics module 2332, text input module 2334, and browser module 2347, the widget creator module 2350 may be used by a user to create widgets (e.g., turning a user-specified portion of a web page into a widget).

In conjunction with touch screen 2312, display system controller 2356, contact module 2330, graphics module 2332, and text input module 2334, search module 2351 includes executable instructions to search for text, music, sound, image, video, and/or other files in memory 2302 that match one or more search criteria (e.g., one or more user-specified search terms) in accordance with user instructions.

In conjunction with touch screen 2312, display system controller 2356, contact module 2330, graphics module 2332, audio circuitry 2310, speaker 2311, RF circuitry 2308, and browser module 2347, video and music player module 2352 includes executable instructions that allow the user to download and play back recorded music and other sound files stored in one or more file formats, such as MP3 or AAC files, and executable instructions to display, present or otherwise play back videos (e.g., on touch screen 2312 or on an external, connected display via external port 2324). In some embodiments, device 2300 may include the functionality of an MP3 player.

In conjunction with touch screen 2312, display controller 2356, contact module 2330, graphics module 2332, and text input module 2334, notes module 2353 includes executable instructions to create and manage notes, to do lists, and the like in accordance with user instructions.

In conjunction with RF circuitry 2308, touch screen 2312, display system controller 2356, contact module 2330, graphics module 2332, text input module 2334, GPS module 2335, and browser module 2347, map module 2354 may be used to receive, display, modify, and store maps and data associated with maps (e.g., driving directions; data on stores and other points of interest at or near a particular location; and other location-based data) in accordance with user instructions.

In conjunction with touch screen 2312, display system controller 2356, contact module 2330, graphics module 2332, audio circuitry 2310, speaker 2311, RF circuitry 2308, text input module 2334, e-mail client module 2340, and browser module 2347, online video module 2355 includes instructions that allow the user to access, browse, receive (e.g., by streaming and/or download), play back (e.g., on the touch screen or on an external, connected display via external port 2324), send an e-mail with a link to a particular online video, and otherwise manage online videos in one or more file formats, such as H.264. In some embodiments, instant messaging module 2341, rather than e-mail client module 2340, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 2302 may store a subset of the modules and data structures identified above. Furthermore, memory 2302 may store additional modules and data structures not described above.

In some embodiments, device 2300 is a device where operation of a predefined set of functions on the device is performed exclusively through a touch screen and/or a touchpad. By using a touch screen and/or a touchpad as the primary input control device for operation of device 2300, the number of physical input control devices (such as push buttons, dials, and the like) on device 2300 may be reduced.

The predefined set of functions that may be performed exclusively through a touch screen and/or a touchpad include navigation between user interfaces. In some embodiments, the touchpad, when touched by the user, navigates device 2300 to a main, home, or root menu from any user interface that may be displayed on device 2300. In such embodiments, the touchpad may be referred to as a "menu button." In some other embodiments, the menu button may be a physical push button or other physical input control device instead of a touchpad.

Example Computing Device

Figure 16:
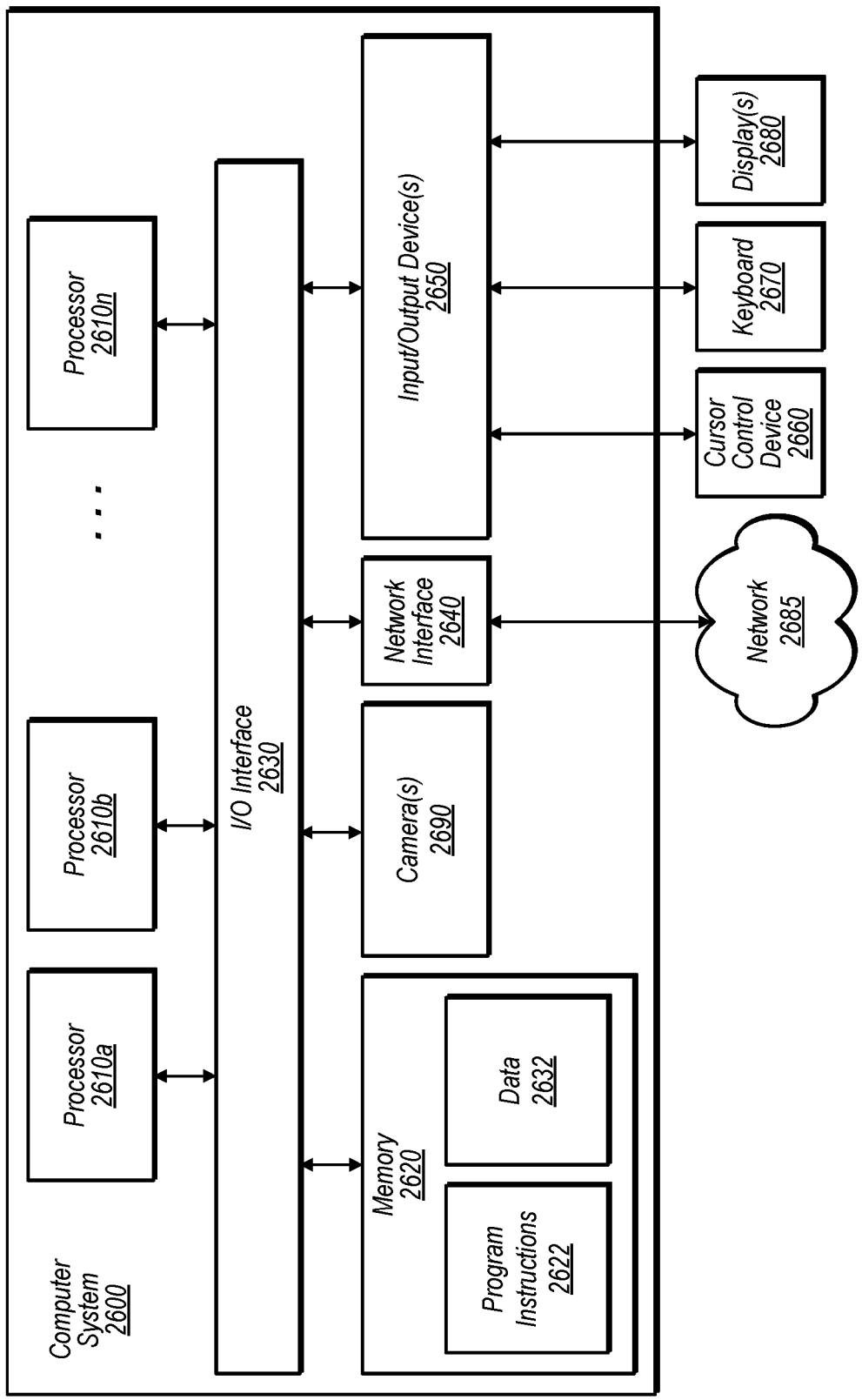
FIG. 16 illustrates an example computing device.

FIG. 16 illustrates an example computing device, referred to as computer system 2600, that may include or host embodiments of a camera as illustrated in FIGS. 1-3. In addition, computer system 2600 may implement methods for controlling operations of the camera and/or for performing image processing of images captured with the camera. In different embodiments, computer system 2600 may be any of various types of devices, including, but not limited to, a personal computer system, desktop computer, laptop, notebook, tablet or pad device, slate, or netbook computer, mainframe computer system, handheld computer, workstation, network computer, a camera, a set top box, a mobile device, a wireless phone, a smartphone, a consumer device, video game console, handheld video game device, application server, storage device, a television, a video recording device, a peripheral device such as a switch, modem, router, or in general any type of computing or electronic device.

In the illustrated embodiment, computer system 2600 includes one or more processors 2610 coupled to a system memory 2620 via an input/output (I/O) interface 2630. Computer system 2600 further includes a network interface 2640 coupled to I/O interface 2630, and one or more input/output devices 2650, such as cursor control device 2660, keyboard 2670, and display(s) 2680. Computer system 2600 may also include one or more cameras 2690, for example one or more cameras as described above with respect to FIGS. 1-3, which may also be coupled to I/O interface 2630, or one or more cameras as described above with respect to FIGS. 1-3 along with one or more other cameras.

In various embodiments, computer system 2600 may be a uniprocessor system including one processor 2610, or a multiprocessor system including several processors 2610 (e.g., two, four, eight, or another suitable number). Processors 2610 may be any suitable processor capable of executing instructions. For example, in various embodiments processors 2610 may be general-purpose or embedded processors implementing any of a variety of instruction set architectures (ISAs), such as the x86, PowerPC, SPARC, or MIPS ISAs, or any other suitable ISA. In multiprocessor systems, each of processors 2610 may commonly, but not necessarily, implement the same ISA.

System memory 2620 may be configured to store program instructions 2622 and/or data 2632 accessible by processor 2610. In various embodiments, system memory 2620 may be implemented using any suitable memory technology, such as static random access memory (SRAM), synchronous dynamic RAM (SDRAM), nonvolatile/Flash-type memory, or any other type of memory. In the illustrated embodiment, program instructions 2622 may be configured to implement various interfaces, methods and/or data for controlling operations of camera 2690 and for capturing and processing images with integrated camera 2690 or other methods or data, for example interfaces and methods for capturing, displaying, processing, and storing images captured with camera 2690. In some embodiments, program instructions and/or data may be received, sent or stored upon different types of computer-accessible media or on similar media separate from system memory 2620 or computer system 2600.

In one embodiment, I/O interface 2630 may be configured to coordinate I/O traffic between processor 2610, system memory 2620, and any peripheral devices in the device, including network interface 2640 or other peripheral interfaces, such as input/output devices 2650. In some embodiments, I/O interface 2630 may perform any necessary protocol, timing or other data transformations to convert data signals from one component (e.g., system memory 2620) into a format suitable for use by another component (e.g., processor 2610). In some embodiments, I/O interface 2630 may include support for devices attached through various types of peripheral buses, such as a variant of the Peripheral Component Interconnect (PCI) bus standard or the Universal Serial Bus (USB) standard, for example. In some embodiments, the function of I/O interface 2630 may be split into two or more separate components, such as a north bridge and a south bridge, for example. Also, in some embodiments some or all of the functionality of I/O interface 2630, such as an interface to system memory 2620, may be incorporated directly into processor 2610.

Network interface 2640 may be configured to allow data to be exchanged between computer system 2600 and other devices attached to a network 2685 (e.g., carrier or agent devices) or between nodes of computer system 2600. Network 2685 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2650 may, in some embodiments, include one or more display terminals, keyboards, keypads, touchpads, scanning devices, voice or optical recognition devices, or any other devices suitable for entering or accessing data by computer system 2600. Multiple input/output devices 2650 may be present in computer system 2600 or may be distributed on various nodes of computer system 2600. In some embodiments, similar input/output devices may be separate from computer system 2600 and may interact with one or more nodes of computer system 2600 through a wired or wireless connection, such as over network interface 2640.

As shown in FIG. 16, memory 2620 may include program instructions 2622, which may be processor-executable to implement any element or action to support integrated camera 2690, including but not limited to image processing software and interface software for controlling camera 2690.

In some embodiments, images captured by camera 2690 may be stored to memory 2620. In addition, metadata for images captured by camera 2690 may be stored to memory 2620.

Those skilled in the art will appreciate that computer system 2600 is merely illustrative and is not intended to limit the scope of embodiments. In particular, the computer system and devices may include any combination of hardware or software that can perform the indicated functions, including computers, network devices, Internet appliances, PDAs, wireless phones, pagers, video or still cameras, etc. Computer system 2600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 2600 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2600 may be transmitted to computer system 2600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Numerous variations and modifications will become apparent to those skilled in the art once the above disclosure is fully appreciated. It is intended that the following claims be interpreted to embrace all such variations and modifications.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   transmitting, by an illuminator of a time-of-flight system on a device, an infrared light signal;
   receiving, by a time-of-flight detector of the time-of-flight system, a first portion of a reflected infrared light signal, wherein the reflected infrared signal includes infrared light transmitted by the illuminator of the time-of-flight system reflected off at least one surface positioned in a field-of-view of the time-of-flight system;
   receiving, by an infrared detector on the device that is independent and a different detector than the time-of-flight detector of the time-of-flight system, a second portion of the reflected infrared signal;
   assessing the second portion of the reflected infrared signal received by the infrared detector to determine whether the at least one surface is within a predetermined distance from the device;
   implementing an autofocus process for a camera system on the device in response to determining that the at least one surface is within the predetermined distance from the device; and
   capturing, by the camera system, at least one image of the at least one surface.

2. The method of claim 1, wherein the autofocus process is a contrast based autofocus process.

3. The method of claim 1, further comprising implementing the autofocus process for the camera system in response to determining that the at least one surface is within the predetermined distance from the device and a confidence level in the second portion of the reflected infrared signal being above a predetermined level.

4. The method of claim 1, further comprising capturing, by a camera system on the device, at least one image of the at least one surface by placing the camera system at infinite focus in response to the at least one surface not being within the predetermined distance from the device.

5. The method of claim 1, wherein determining whether the at least one surface is within the predetermined distance from the device includes:
  determining a power ratio in the second portion of the reflected infrared signal, wherein the power ratio is determined based on an amount of the second portion of the reflected infrared signal received over a period of time; and
  assessing the power ratio to a predetermined threshold to determine whether the at least one surface is within the predetermined distance from the device.

6. The method of claim 5, wherein the power ratio is a direct current (DC) to alternating current (AC) ratio in the second portion of the reflected infrared signal determined in a frequency domain.

7. The method of claim 5, wherein the predetermined threshold corresponds to the predetermined distance.

8. The method of claim 1, wherein the at least one surface is in focus in the at least one captured image.

9. A device, comprising:
  a computer processor;
  a memory;
  a camera system;
  a time-of-flight system configured to transmit an infrared light signal;
  an infrared detector, wherein the infrared detector is independent of the time-of-flight system;
  circuitry coupled to the camera system, the time-of-flight system, and the infrared detector, wherein the circuitry is configured to:
    transmit, by the time-of-flight system, an infrared light signal;
    receive, by the infrared detector, a reflected infrared signal, wherein the reflected infrared signal includes infrared light from the time-of-flight system reflected off at least one surface positioned in a field-of-view of the infrared detector and the time-of-flight system;
    determine a power ratio in the reflected infrared signal, wherein the power ratio is determined based on an amount of the reflected infrared signal received over a period of time;
    assess the power ratio to a predetermined threshold to determine whether the at least one surface is within a predetermined distance from the device; and
    capture at least one image by the camera system.

10. The device of claim 9, wherein the infrared light signal transmitted by the time-of-flight system is transmitted periodically.

11. The device of claim 9, wherein the circuitry is configured to:
  implement an autofocus process for the camera system in response to the power ratio being below the predetermined threshold; and
  capture the at least one image of the at least one surface using the autofocus process.

12. The device of claim 9, wherein the circuitry is configured to:
  place the camera system at infinite focus in response to the power ratio being above the predetermined threshold; and
  capture the at least one image of the at least one with the camera system at the infinite focus.

13. The device of claim 9, wherein the infrared detector is located in a housing module on the device that is separate from a housing module for the time-of-flight system.

14. The device of claim 9, wherein the infrared detector utilizes a different aperture on the device from an aperture utilized by the time-of-flight system.

15. A method, comprising:
  transmitting, by a time-of-flight system on a device, an infrared light signal;
  receiving, by an infrared detector on the device that is independent of the time-of-flight system, a reflected infrared signal, wherein the reflected infrared signal includes infrared light from the time-of-flight system reflected off at least one surface positioned in a field-of-view of the infrared detector and the time-of-flight system;
  assessing a direct current (DC) to alternating current (AC) ratio in the reflected infrared signal, wherein the DC to AC ratio is determined based on an amount of the reflected infrared signal received over a period of time; and
  determining a distance between the at least one surface and the device based on the DC to AC ratio.

16. The method of claim 15, wherein the distance is determined from a calibration curve correlating the distance to the DC to AC ratio.

17. The method of claim 15, further comprising determining, for a camera system on the device, a focus position based on the determined distance.

18. The method of claim 17, further comprising capturing, by the camera system, at least one image of the at least one surface at the determined focus position.

19. The method of claim 15, further comprising, for a camera system on the device:
  implementing an autofocus process for the camera system in response to the determined distance being less than a predetermined distance; and
  placing the camera system at infinite focus in response to the determined distance being greater than the predetermined distance.

20. The method of claim 19, wherein the predetermined distance corresponds to a distance below which the time-of-flight system does not have sufficient data to determine the distance.

* * * * *